United States Patent
Buechele et al.

[11] Patent Number: 5,179,761
[45] Date of Patent: Jan. 19, 1993

[54] AERODYNAMIC WINDSHIELD WIPER SUPERSTRUCTURE

[75] Inventors: Franz Buechele; Stephen G. Dipple, both of Ontario, Canada

[73] Assignee: Tridon Limited, Burlington, Canada

[21] Appl. No.: 599,936

[22] Filed: Oct. 19, 1990

[51] Int. Cl.⁵ .............................................. B60S 1/04
[52] U.S. Cl. .................................................. 15/250.42
[58] Field of Search .......... 15/250.42, 250.41, 250.20, 15/250.36, 250.35, 250.38, 250.39; D12/155

[56] References Cited

U.S. PATENT DOCUMENTS

| | | | |
|---|---|---|---|
| 1,441,593 | 1/1923 | Lavietes | 15/250.41 |
| 2,814,820 | 12/1957 | Elliott et al. | 15/250.36 |
| 2,937,393 | 5/1960 | Brueder | 15/250.42 |
| 3,037,233 | 6/1962 | Peras et al. | 15/250.36 |
| 3,089,174 | 5/1963 | Bignon | 15/250.36 |
| 3,317,946 | 5/1967 | Anderson | 15/250.42 |
| 3,390,417 | 7/1968 | Kohler et al. | 15/250.42 |
| 3,405,421 | 10/1968 | Tomlin | 15/250.42 |
| 3,673,631 | 7/1972 | Yamadai et al. | 15/250.42 |
| 3,780,395 | 12/1973 | Quinlan et al. | 15/250.36 |
| 3,862,465 | 1/1975 | Ito | 15/250.42 |
| 3,879,793 | 4/1975 | Schlegel | 15/250.42 |
| 4,309,790 | 1/1982 | Bauer et al. | 15/250.42 |
| 4,400,845 | 8/1983 | Noguchi et al. | 15/250.42 |
| 4,561,143 | 12/1985 | Beneteau | 15/250.42 |
| 4,570,284 | 2/1986 | Verton | 15/250.42 |
| 4,628,565 | 12/1986 | Walters | 15/250.42 |
| 4,852,206 | 8/1989 | Fisher | 15/250.42 |

FOREIGN PATENT DOCUMENTS

| | | | |
|---|---|---|---|
| 12018 | 3/1970 | Australia . | |
| 1227791 | 10/1966 | Fed. Rep. of Germany | 15/250.42 |
| 3139444 | 4/1983 | Fed. Rep. of Germany | 15/250.42 |
| 3532535 | 3/1987 | Fed. Rep. of Germany | 15/250.42 |
| 3637348 | 5/1988 | Fed. Rep. of Germany | 15/250.20 |
| 1428310 | 1/1966 | France | 15/250.42 |
| 1520385 | 3/1968 | France | 15/250.42 |
| 939404 | 10/1963 | United Kingdom . | |
| 1035798 | 7/1966 | United Kingdom | 15/250.42 |
| 2106775 | 4/1983 | United Kingdom . | |
| 2151914 | 7/1985 | United Kingdom | 15/250.42 |
| 8400523 | 2/1984 | World Int. Prop. O. | 15/250.42 |

Primary Examiner—Harvey C. Hornsby
Assistant Examiner—Gary K. Graham
Attorney, Agent, or Firm—Rogers & Scott

[57] ABSTRACT

A windshield wiper superstructure of which the primary yoke has transversely spaced leeward and windward sides extending along the length thereof and transversely extending alignment means adapted to maintain a predetermined distance between said sides, the inner surface of the leeward side adjacent the windward side being inclined toward the windward side to define a ramp for directing air flow through the primary yoke.

3 Claims, 2 Drawing Sheets

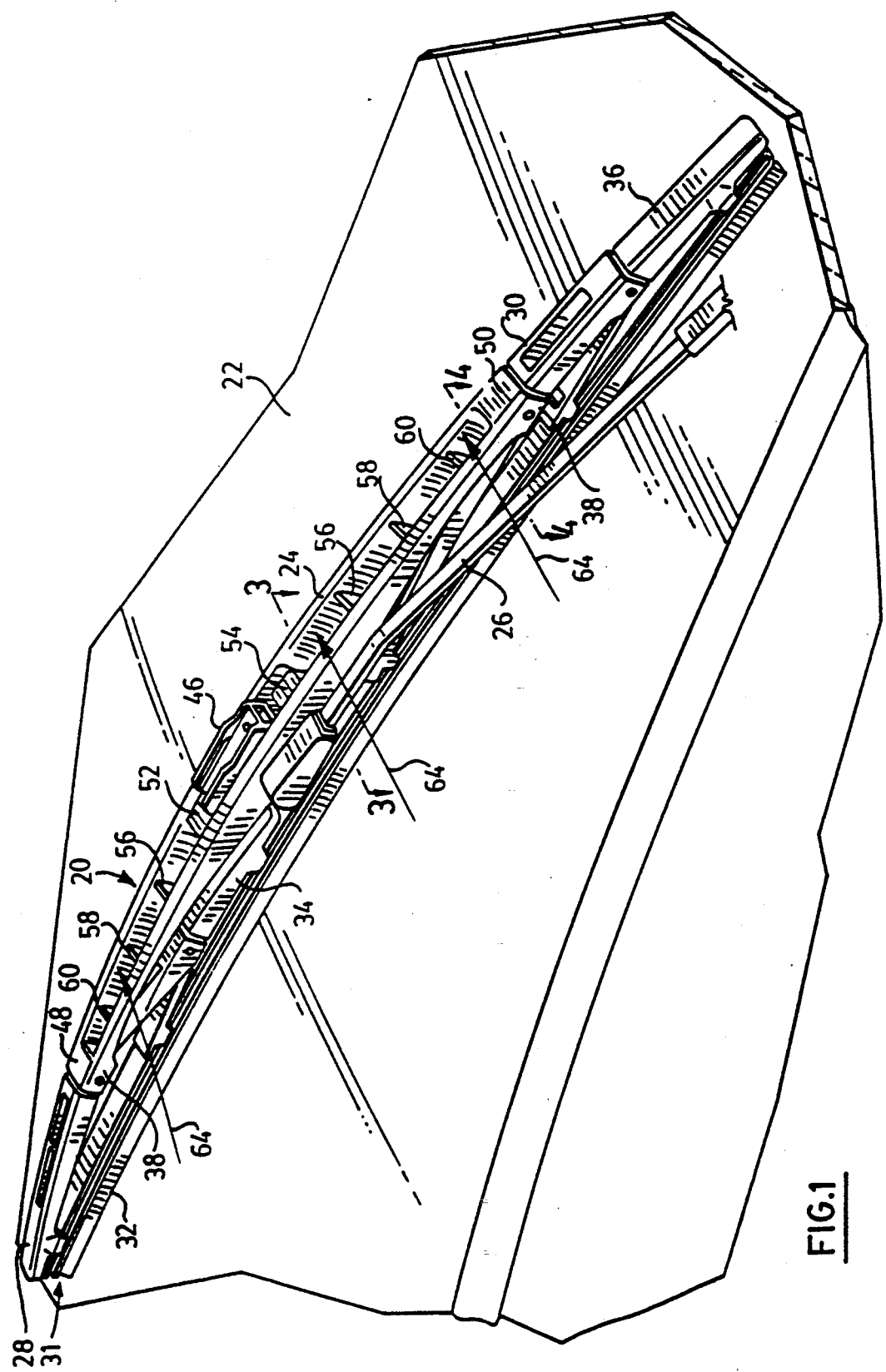

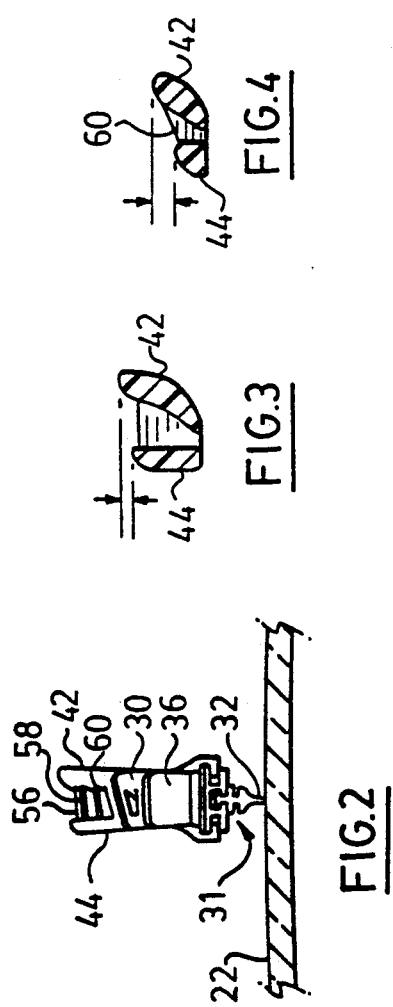
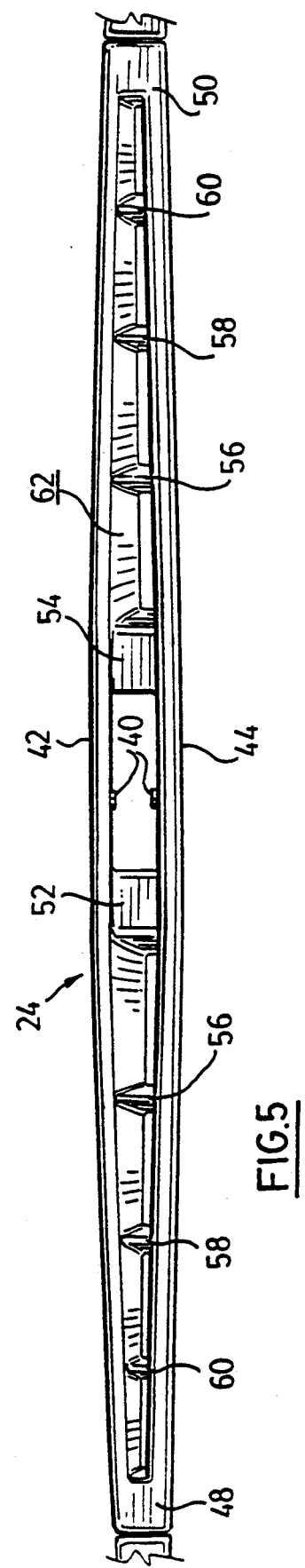

AERODYNAMIC WINDSHIELD WIPER SUPERSTRUCTURE

BACKGROUND OF THE INVENTION

This invention relates to the structure of a windshield wiper which supports a squeegee for wiping a windshield and which distributes pressure applied to the squeegee from the wiper arm. It is well known that such structures interfere with the natural air flow pattern created about a windshield when a vehicle moves at high speed and that in certain circumstances this interference will result in the windshield wiper being lifted away from the windshield with obviously undesirable consequences.

Wing attachments, secured to the windshield wiper body and shaped to redirect the air flow pattern so as to push the wiper against the windshied, are one of the kinds of structures which have been developed to address this problem. In other cases, the windshield wiper superstructure itself is profiled to disturb an oncoming air stream to cause a drag effect instead of a lift effect, for example in U.S. Pat. No. 4,400,845. In the structure of this patent, like many others, a major surface of the wiper is inclined relative to the windshield in use. In U.S. Pat. No. 4,852,206, the degree of inclination of this surface relative to the oncoming air stream varies along the length of the primary yoke. Another approach to the problem has been to provide apertures to allow air flow to pass through the structure as in U.S. Pat. No. 3,089,174 which illustrates a squeegee formed with a series of pressure relieving holes distributed along its length.

In some of the windshield wiper structures which carry an inclined surface for air flow control, it is recognized that air flow through the structure beneath the inclined surface will occur and operate to create a negative pressure thereby minimizing lift.

To applicant's knowledge no structure has been devised in which this through air, which in some orientations of the wiper must necessarily impinge on the wiper structure, is harnessed so as to positively push the wiper against the windshield.

The object of this invention is to provide a windshield wiper superstructure having an aerodynamic profile whereby the tendancy of a wiper to lift away from a windshield in use is minimized.

SUMMARY OF THE INVENTION

In accordance with the invention, there is provided a windshield wiper superstructure comprising a longitudinally extending primary yoke, the yoke having first attachment means for connection to a wiper squeegee and second attachment means adapted for connection to a wiper arm, the yoke having transversely spaced leeward and windward sides extending along the length thereof and transversely extending alignment means adapted to maintain a predetermined distance between said sides, the inner surface of the leeward side adjacent the windward side being inclined toward the windward side thereby defining a ramp for directing air flow through the primary yoke.

BRIEF DESCRIPTION OF THE DRAWINGS

A preferred embodiment of the invention will now be described with reference to the accompanying drawings, in which:

FIG. 1 is a perspective view illustrating a windshield wiper incorporating a primary yoke made according to the invention;

FIG. 2 is an end elevational view of the wiper of FIG. 1;

FIG. 3 is a cross-sectional view on line 3—3 of FIG. 1 showing the profile of the primary yoke;

FIG. 4 is a similar view to FIG. 3 drawn on line 4—4 of FIG. 1; and

FIG. 5 is a top plan view of the primary yoke of FIG. 1.

DETAILED DESCRIPTION WITH REFERENCE TO THE DRAWINGS

A windshield wiper according to the invention is generally indicated by numeral 20 in FIG. 1 in an operative orientation on a windshield 22. The wiper has a superstructure comprising a primary yoke 24 which is attached on its windward side to a wiper arm 26 driven by a motor (not shown) to reciprocate over the windshield 22. A pair of secondary yokes 28, 30 are attached to respective ends of the primary yoke 24. The secondary yokes 28, 30 are pivoted between their ends to the primary yoke 24 such that an inner end lies underneath the primary yoke and an outer end is exposed to define an extension of the primary yoke. In the case of the secondary yoke 28 remote from the wiper arm 26, the outer end also defines an outer extremity for the windshield wiper 20 and has a pair of oppositely directed claws for slidably receiving a windshield wiper refill 31 including a squeegee 32. A first tertiary yoke 34 is pivoted between its ends to the inner end of the secondary yoke 28 and also has, at each end, a pair of oppositely directed claws for slidably receiving the refill 31. At the inner end of the wiper nearest the arm 26, the inner end of the secondary yoke 30 has oppositely directed claws to receive the refill 31 and at its outer end, pivotally supports a second tertiary yoke 36 of which the inner end lies underneath the associated secondary yoke 30 and the outer end is exposed to define a continued extension of the secondary yoke 30 and the primary yoke 24. The outer end of said tertiary yoke 36 also carries a pair of oppositely directed claws which similarly to the other claws, slidably receive the refill 31. It will be noted that this arrangement of the tertiary yoke 36 at the inner end of the wiper allows the wiper to conform to a greater curvature in the windshield 22.

The subject of the invention is the primary yoke 24. It will be appreciated from the description which follows that the arrangement of the secondary yokes and tertiary yokes as described above are merely illustrative and not intended to limit the scope of the protection sought.

The primary yoke 24 will now be described in more detail with reference being made particularly to FIGS. 2 to 5 from which it will be clear that the structure is molded from a synthetic plastic material. It will be seen that the primary yoke extends longitudinally between first attachment means adapted for connection to a wiper squeege, said means being in the form of apertured opposite flanges 38 pivotally receiving secondary and tertiary yokes which slidably receive the refill containing the squeegee 32. Second attachment means adapted for connection to a wiper arm are provided between the ends of the primary yoke 24 and comprise a pair of opposite, inwardly directed stubs 40 mounted to respective, transversely spaced leeward and windward sides 42, 44 (FIG. 5) which extend along the length of the primary yoke and which have a smoothly rounded profile at the top and the bottom 24. An adaptor 46 (FIG. 1) is slidably received on the stubs 40 and establishes the connection between the primary yoke 24 and the wiper arm 26.

Transversely extending webs 48, 50, 52, 54 lying generally parallel to the windshield 22 in the operative orientation of the wiper 20 are provided at the ends of the primary yoke 24 and centrally between the ends to either side of the stubs 40. A passage for receiving and accomodating the adaptor 46 is defined by the central webs 52, 54 and the leeward side 42 and windward side 44.

The transverse width of the primary yoke 24 defined by the separation between the apertured flanges 38 is a minimum at said first attachment means, and a maximum at the second attachment means where it is defined by the separation between the leeward side 42 and windward side 44 in the vicinity of the stubs 40. Three pairs of webs 56, 58, 60 extending upwardly from the windshield in the operative orientation of the wiper and spaced along the length of the primary yoke 24 connect the leeward and windward sides 42, 44 and are dimensioned to maintain the aforesaid alignment, the innermost webs 56 being longer than the outermost webs 60.

The inner surface 62 of the leeward side 42 between the end webs 48, 50 and the central webs 52, 54 adjacent the adaptor 46 is inclined toward the windward side 44 and thereby defines a ramp for directing air flow through the primary yoke 24.

As can be seen most clearly in FIGS. 2-4, the effective height of the leeward side 42 above the windshield 22 exceeds the effective height of the windward side 44 for a portion of their lengths, that is between said end webs 48, 50 of the yoke and the central webs 52, 54 adjacent the adaptor 46. In this way, the leeward side 42 is exposed to air flowing across the yoke as indicated by arrows 64 (FIG. 1) over the windward side 42.

It will be understood that any air flow between the primary yoke 24 and the secondary yokes 28, 30 will also impinge on said inclined surface 62 with the effect of pushing the wiper 20 against the windshield 22.

As will be seen most clearly in FIGS. 3 and 4, the relative heights of the windward and leeward sides 42, 44 vary along the length of the primary yoke being a maximum near the end webs 48, 50 and a minimum at the central webs 52, 54.

The exposed portions of the secondary yokes 28, 30 adjacent the pivot connections with the primary yoke 24 are similarly profiled for continuity in the appearance of the wiper and have respective spaced leeward and windward sides. The relative heights of the leeward sides to the windward sides on the secondary yokes 28, 30 are a maximum at the joints with the primary yoke 24 and decrease gradually until the leeward sides and windward sides are equal at the ends remote from the wiper arm 26.

In use, it will be appreciated that a windshield wiper superstructure including a primary yoke made according to the invention provides a surface which is inclined relative to an oncoming air stream with maximum exposure adjacent the attachment means for a wiper arm and minimum exposure at the ends remote from the arm, conveniently providing a ramp for directing any air impinging on the bottom of the primary yoke through the structure and harnassing the force of this air to positively push the wiper agains the windshield. This is particularly advantageous in orientations of the wiper which approach the parked position in which the predominant air stream does not impinge on the wiper structure at right angles and therefore cannot simply pass between the primary yoke and the underlying secondary yokes.

We claim:

1. A windshield wiper assembly comprising a superstructure and a squeegee positioned below and connected to the superstructure in an operative orientation for wiping a windshield, the superstructure being adapted for connection to a wiper arm driven to reciprocate the superstructure over a windshield with and against a natural prevailing air flow over said windshield, and including a longitudinally extending primary yoke, the primary yoke comprising:

a synthetic plastic molding having transversely spaced leeward and windward sides relative to said air flow, said sides having a predetermined separation between opposed inner surfaces thereof which increases from a minimum at an operative bottom side of the yoke to a maximum at an operative top side of the yoke remote from the windshield;

a gap defined between said inner surfaces extending through said primary yoke between the bottom and top sides thereof through which air may pass;

said leeward and windward sides having a smoothly rounded profile at the top and bottom, thereby minimizing any turbulence which may be created when said air flow impinges on the primary yoke; and the leeward side extending upwardly above the windshield by a distance defining the effective height of the leeward side, the windward side similarly extending upwardly above the windshield by a distance defining the effective height of the windward side, said effective height of the leeward side exceeding the effective height of the windward side for at least a portion of the length of the yoke so that the leeward side is exposed to air flowing across the yoke over the windward side on said portion, and the assembly is pushed against the windshield.

2. A windshield wiper superstructure according to claim 1 and including at least two secondary yokes disposed on opposite ends of the primary yoke and adapted for connection to a wiper squeegee, in which the relative effective height of the windward side to the leeward side varies on said portion such that the vertical separation between the windward side and the leeward side is at a maximum at opposite ends of the primary yoke where the primary yoke is connected to the secondary yoke so that any downward pressure imparted on the primary yoke and applied through the secondary yokes to the squeegee may be maximized.

3. A windshield wiper superstructure according to claim 1 including transversely disposed alignment means disposed between the inner surfaces of the primary yoke and comprising a number of webs spaced along the length of the yoke and connecting the windward and leeward sides to each other, the webs extending generally upwardly from the windshield and being spaced from one another to minimize the surface area exposed to the air flow and any resulting turbulence which may be created when said air flow impinges on the primary yoke.

* * * * *